J. P. FULGHUM.
Grain Drill
No. 100,998. Patented March 22, 1870.
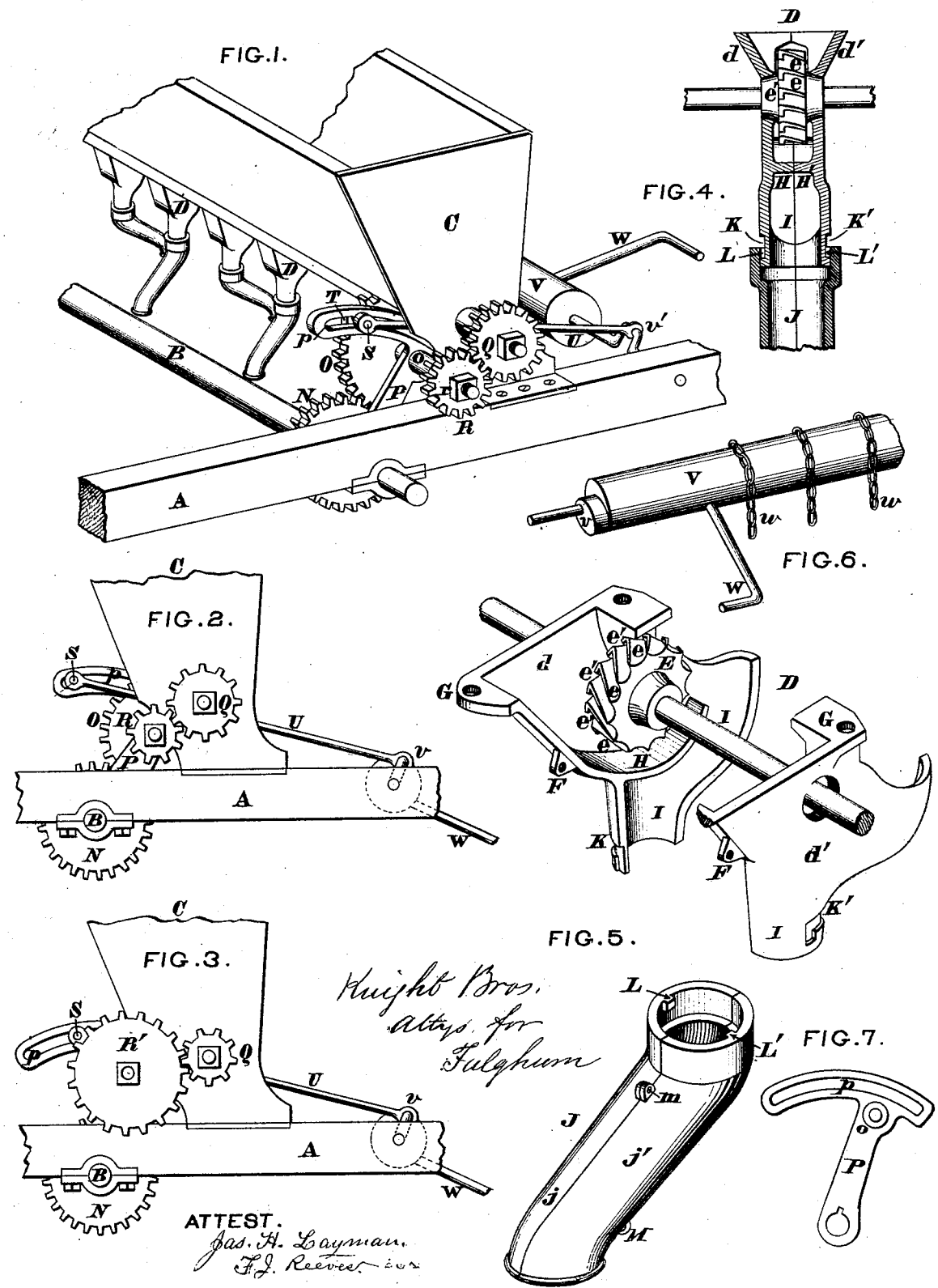

United States Patent Office.

JESSE P. FULGHUM, OF DUBLIN, INDIANA, ASSIGNOR TO HIMSELF AND DAVIS LAWRENCE & CO.

Letters Patent No. 100,998, dated March 22, 1870.

IMPROVEMENT IN GRAIN-DRILLS.

The Schedule referred to in these Letters Patent and making part of the same.

I, JESSE P. FULGHUM, of Dublin, Wayne county, Indiana, have invented a new and useful Improvement in Grain-Drills, of which the following is a specification.

Nature and Objects of the Invention.

This is an improvement in the class of grain-drills from whose hopper the seed is fed down or delivered into the spouts by the action of a series of wheels upon a feed-rod which is rotated by suitable geared connection with the axle; and The first part of my improvement relates to an arrangement of the said geared connection and its accessories, which enables the feed-mechanism to be run to any desired speed with reference to the axle, and which is also such as to disconnect the said gearing by the same act which elevates the hoes or teeth, thus automatically arresting the seed-delivery at the instant when no longer needed.

The second part of my invention relates to an economical and compact construction of the feed-cup and grain-spout, with a mode of coupling and connecting the latter, which enables it to be set for planting in either one or two ranks.

The third part of my invention relates to a peculiar form or construction of feed-wheel.

General Description with Reference to the Drawings.

Figure 1 shows by perspective view a portion of one side of a grain-drill embodying my improvements.

Figure 2 is an elevation of the same.

Figure 3 is a similar elevation, but with a change of gearing for greater feed-delivery.

Figure 4 is a vertical front and rear section of a feed cup, and portion of the grain-spout.

Figure 5 is an enlarged perspective view of the feed-cup separated, and grain-spout detached.

Figure 6 is a perspective rear view of one end of the lifting-bar.

Figure 7 is a detached elevation of the jack-plate.

A represents a portion of the main frame.

B is a portion of the axle of the ground-wheels, which are not shown.

C is a customary hopper having the usual perforated bottom, to which is attached a series of feed-cups, D, of peculiar construction, namely: of two parts, $d\ d'$, which are joined in the plane of the feed-wheel E, by a bolt at the lugs F, and other bolts through the lugs G to the bottom of the hopper.

Two inwardly-projecting flanges, H H', unite to form a concave bottom, concentric, or nearly so, to the feed-wheel, and terminating on the delivery side of the wheel somewhat short of the cup side, so as to permit the grain to drop into a curved duct or passage, I, which conducts into or forms the upper part of the spout J, to which is attached the tube of rubber or other suitable material, not here shown, that conveys the grain into the customary tubular drill-teeth.

The feed-wheel E is armed around its periphery with a series of oblique blades, $e$, which blades terminate with shoulders, $e'$, at their retiring ends, to prevent the crowding and wedging of the grain at that end of the wheel.

The lower end or neck of the duct I has two grooves, K K', like the lower half of a Roman letter L inverted, to receive two pins, L L', projecting inwardly from the rim or upper margin of the spout J, which spout may by these means be so coupled to said neck as to depend either all obliquely forward, or all obliquely backward, or alternately forward and backward, as in fig. 1, so as to plant in two ranks if desired.

The spout J is cast in two parts, $j\ j$, which are then united by lugs M and rivets $m$.

The axle is armed with a spur-wheel, N, which gears with a wheel, O, that is journaled in a shiftable jack-plate, P, that can be swung forward or backward upon or about the axle as a pivot.

The shaft $o$ of the wheel O extends through to the front or outer side of the jack-plate, and carries a pinion, R or R', of any desired size, and which gears in the spur-wheel Q on the end of the feed-rod.

The jack-plate P has a slot, $p$, concentric with said axle, and which receives a stud, S, that may be fastened to any part of the slot by suitable nut, T.

To this stud is attached the rod U, which I call the shipper-rod, whose other end engages around an eccentric, $v$, or crank, $v'$, on the bar V, of customary form for lifting the drill-teeth out of the ground.

W represents a handle of the lifter-bar, and $w$ some of the chains which connect to the drill-teeth.

Operation.

When it is desired to discontinue the action of the drill, the teeth are lifted in the usual manner of elevating the handle W, and this action, at the same time operating through the medium of the shipper-rod U, throws the jack-plate P sufficiently forward to ungear the pinion R from the wheel Q, so as to arrest the motion of the seed-delivering apparatus.

Should it be desired to run the seed-delivery at a higher speed, it is merely necessary to remove the nuts T and $r$, and having removed the wheel R, to shift the plate P sufficiently forward to enable the insertion of the substitute wheel R', and having returned the plate P until the wheels R' and Q are in gear, to secure the said wheel R' and the stud S to their places by means of nuts $r$ and T.

Claims.

I claim as new and of my invention—

1. In the described combination with a customary or any suitable lifting-bar for unearthing the drill-teeth, the arrangement of shipper-rod U, and vibrating plate P, which carries one of the intermediate wheels of the dropper-gearing, for the purpose set forth.

2. In the described combination with the elements of the preceding clause, the nut T and bolt S, adjustable in the slot *p* of the plate P.

3. The described construction of the separable feed-cup D, with its concave floor H and passage I, substantially as represented and described.

4. In the described combination with the grooved neck K K' of the passage I, the reversible and detachable spout J, provided with the lugs L L'.

5. The feed-wheel E *e e'*, formed and adapted to operate as set forth.

In testimony of which invention I hereunto set my hand.

JESSE P. FULGHUM.

Witnesses:
 GEO. H. KNIGHT,
 JAMES H. LAYMAN